US009215377B2

United States Patent
Sokeila et al.

(10) Patent No.: US 9,215,377 B2
(45) Date of Patent: Dec. 15, 2015

(54) DIGITAL ZOOM WITH SENSOR MODE CHANGE

(71) Applicant: Nokia Corporation, Espoo (FI)

(72) Inventors: Tomi Sokeila, Tampere (FI); Mikko Muukki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 79 days.

(21) Appl. No.: 14/096,575

(22) Filed: Dec. 4, 2013

(65) Prior Publication Data

US 2015/0156421 A1    Jun. 4, 2015

(51) Int. Cl.
| | |
|---|---|
| H04N 5/232 | (2006.01) |
| H04N 3/14 | (2006.01) |
| H04N 5/345 | (2011.01) |
| H04N 5/262 | (2006.01) |
| H04N 5/235 | (2006.01) |
| H04N 5/335 | (2011.01) |

(52) U.S. Cl.
CPC ................................ *H04N 5/23296* (2013.01)

(58) Field of Classification Search
CPC ............ H04H 5/23296; H04N 5/2628; H04N 5/23296; H04N 3/1562; H04N 3/155; H04N 5/23245; H04N 5/3454; H04N 3/14; H04N 5/235; H04N 5/335
USPC .................. 348/240.99, 240.1, 240.2, 333.12
See application file for complete search history.

(56) References Cited

U.S. PATENT DOCUMENTS

| | | | |
|---|---|---|---|
| 5,172,234 A * | 12/1992 | Arita et al. .................. | 348/240.2 |
| 6,750,903 B1 * | 6/2004 | Miyatake et al. .......... | 348/218.1 |
| 7,231,100 B2 * | 6/2007 | Pilu .............................. | 382/298 |
| 7,499,600 B2 | 3/2009 | Ojanen et al. ................. | 382/275 |
| 7,688,364 B2 * | 3/2010 | LeGall et al. ............. | 348/240.99 |
| 7,920,180 B2 * | 4/2011 | Stavely et al. ............. | 348/240.2 |
| 8,035,689 B2 | 10/2011 | Alakarhu ................. | 348/207.11 |
| 8,106,956 B2 | 1/2012 | Nikkanen et al. .......... | 348/222.1 |
| 8,111,305 B2 * | 2/2012 | Taoka et al. ................ | 348/240.2 |

(Continued)

FOREIGN PATENT DOCUMENTS

WO      WO 03/052712 A1     6/2003

OTHER PUBLICATIONS

Jbeale, "RPi Camera issues and status", http://www.raspberrypi.org/phpBB3/viewtopic.php?f=43&t=44879, (May 24, 2013), (8 pages).

(Continued)

*Primary Examiner* — Tuan Ho
*Assistant Examiner* — Marly Camargo
(74) *Attorney, Agent, or Firm* — Harrington & Smith (57) ABSTRACT

An apparatus including at least one processor; and at least one non-transitory memory including computer program code, the at least one memory and the computer program code configured to, with the at least one processor, cause the apparatus at least to, during a digital zoom having increasing or decreasing zoom values for first frames taken by a camera, and based upon a sensor mode changing from a first sensor mode to a different second sensor mode, using at least one new different zoom value to one of the first frames captured by the camera before the sensor mode change to form at least one new second frame.

20 Claims, 5 Drawing Sheets

(56) References Cited

U.S. PATENT DOCUMENTS

| | | | |
|---|---|---|---|
| 8,599,244 B2* | 12/2013 | Hirooka et al. | 348/47 |
| 8,605,172 B2* | 12/2013 | Nikkanen et al. | 348/240.2 |
| 2006/0171703 A1* | 8/2006 | Abe et al. | 396/311 |
| 2007/0296837 A1* | 12/2007 | Morita | 348/240.99 |
| 2008/0192138 A1* | 8/2008 | Higashiyama et al. | 348/345 |
| 2008/0239103 A1* | 10/2008 | Bocking et al. | 348/240.99 |
| 2010/0321535 A1* | 12/2010 | Rodriguez et al. | 348/240.2 |
| 2012/0114319 A1* | 5/2012 | Kishida | 396/71 |

OTHER PUBLICATIONS

Panasonic, "Crystal Engine Pro", http://panasonic.net/avc/camcorder/hd/sdt750/2d_feature1.html, (2013), (9 pages).

Barnes, et al., "Video Tapestries With Continuous Temporal Zoom", http://gfx.cs.princeton.edu/pubs/Barnes2010VTW/tapestry_electronic.pdf, (2010), (8 pages).

Deshaler, version 3.0, http://www.guthspot.se/video/deshaker.htm, (2013), (20 pages).

* cited by examiner

DIGITAL ZOOM WITH SENSOR MODE CHANGE

BACKGROUND

1. Technical Field

The exemplary and non-limiting embodiments relate generally to a digital zoom and, more particularly, to frames during a sensor mode change.

2. Brief Description of Prior Developments

Digital cameras are known which use digital zoom.

SUMMARY

The following summary is merely intended to be exemplary. The summary is not intended to limit the scope of the claims.

In accordance with one aspect, an example embodiment is provided in an apparatus comprising at least one processor; and at least one non-transitory memory including computer program code, the at least one memory and the computer program code configured to, with the at least one processor, cause the apparatus at least to, during a digital zoom having increasing or decreasing zoom values for first frames taken by a camera, and based upon sensor mode changing from a first sensor mode to a different second sensor mode, using at least one new different zoom value to one of the first frames captured by one camera before the sensor mode change to form at one new second frame.

In accordance with another aspect, an example method comprises increasing or decreasing zoom values for a camera during a digital zoom; during the digital zoom, changing a sensor mode of the digital zoom from a first sensor mode to a different second sensor mode; and using a new different zoom value to at least one frame captured by the camera before the sensor mode change to thereby form at least one new frame during the digital zoom.

In accordance with another aspect, an example embodiment comprised a non-transitory program storage device readable by a machine, tangibly embodying a program of instructions executable by the machine for performing operations, the operations comprising increasing or decreasing camera zoom values during a digital zoom; during the digital zoom, changing a sensor mode of the digital zoom from a first sensor mode to a different second sensor mode; and using a new different zoom value to at least one frame captured by a camera before the sensor mode change to form at least one new frame during the digital zoom.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
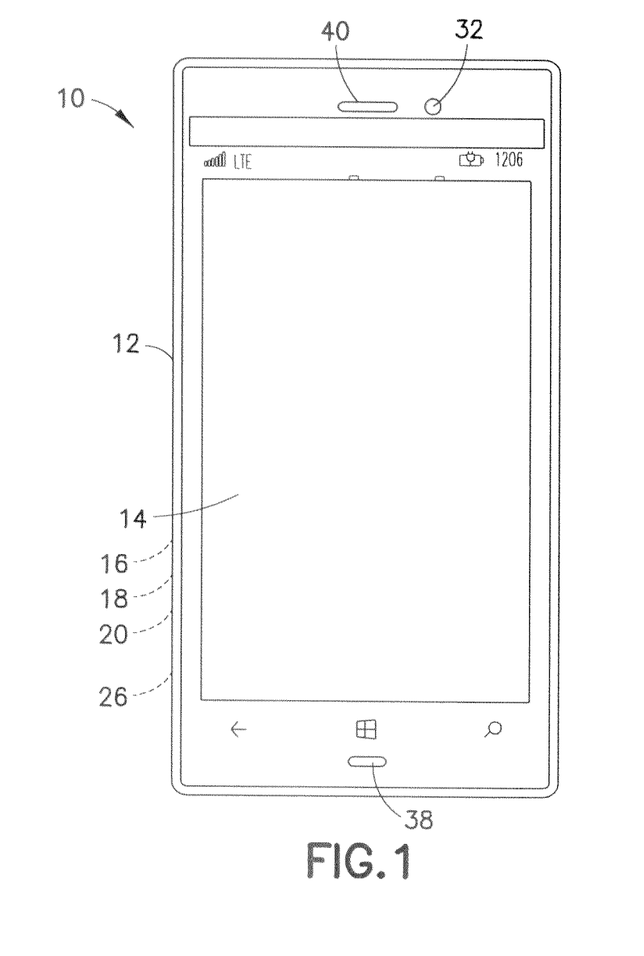
FIG. 1 is a front view an example embodiment of an apparatus comprising features as described herein.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone.

Figure 2:
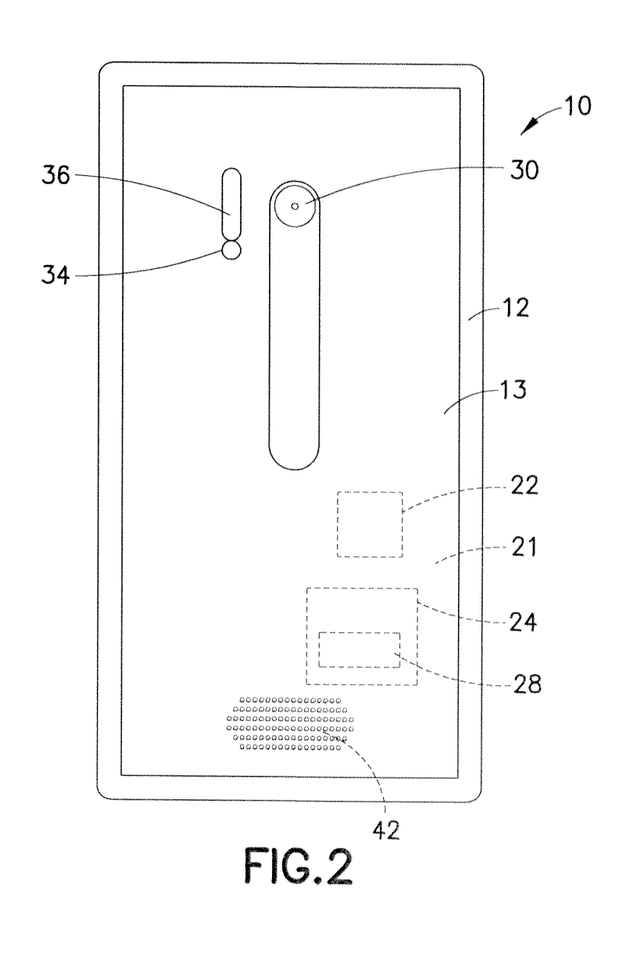
FIG. 2 is a rear view of the apparatus shown in FIG. 1.
Figure 3:
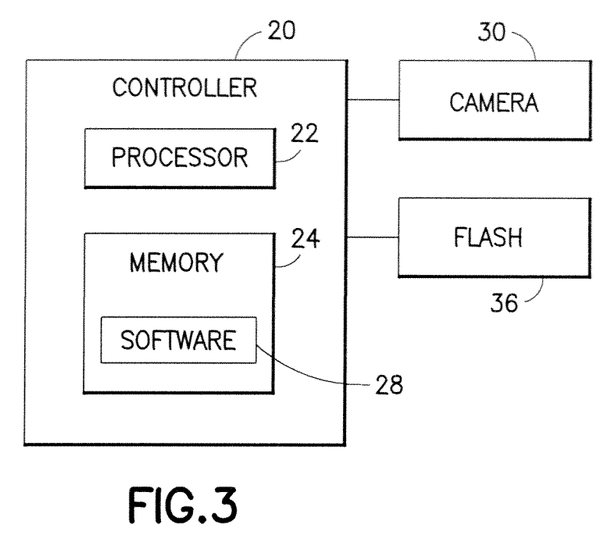
FIG. 3 is a diagram illustrating some components of the apparatus shown in FIGS. 1-2.

Referring also to FIGS. 2-3, the apparatus 10, in this example embodiment, comprises a housing 12, a touchscreen 14, a receiver 16, a transmitter 18, a controller 20, a rechargeable battery 26 and a camera 30. However, all of these features are not necessary to implement the features described below. The controller 20 may include at least one processor 22, at least one memory 24, and software 28. The electronic circuitry inside the housing 12 may comprise at least one printed wiring board (PWB) 21 having components such as the controller 20 thereon. The receiver 16 and transmitter 18 form a primary communications system to allow the apparatus 10 to communicate with a wireless telephone system, such as a mobile telephone base station for example.

In this example, the apparatus 10 includes the camera 30 which is located at the rear side 13 of the apparatus, a front camera 32, an LED 34, and a flash system 36. The LED 34 and the flash system 36 are also visible at the rear side of the apparatus, and are provided for the camera 30. The cameras 30, 32, the LED 34 and the flash system 36 are connected to the controller 20 such that the controller 20 may control their operation. In an alternate example embodiment the rear side may comprise more than one camera, and/or the front side could comprise more than one camera. The apparatus 10 includes a sound transducer provided as a microphone 38. In an alternate example the apparatus may comprise more than one microphone. The apparatus 10 includes a sound transducer provided as an earpiece 40, and a sound transducer provided as a speaker 42. More or less than one speaker may be provided.

The apparatus 10 is configured to provide a digital zoom. Digital zoom is a method of decreasing (narrowing) the apparent angle of view of a digital photographic or video image. Digital zoom is accomplished such as by cropping an image down to a centered area with the same aspect ratio as the original, and usually also interpolating the result back up to the pixel dimensions of the original. It is accomplished electronically, with no adjustment of the camera's and no optical resolution is gained in the process. The apparatus 10 may be provided with an optical zoom capability also. Some digital cameras rely entirely on digital zoom, lacking an optical zoom lens. Other cameras do have an optical zoom lens, but apply digital zoom automatically once its longest focal length has been reached.

The apparatus 10 is configured to use both binning and cropping with digital zoom. While performing digital zooming the apparatus 10 may use the different sensor modes (binned and cropped) as needed. For example, while in a wide zoom position the apparatus may use the binned sensor mode, and while in a telephoto zoom position the apparatus may use the cropped sensor mode. Reprogramming the camera sensor to change from one sensor mode to another different sensor mode will take some time (such as about 50-200 ms for example). Frames are not captured by the camera sensor during this change in the sensor mode. Therefore, the constant framerate from the camera would ordinarily not be able to be maintained. This might causes a visible jump in a video stream, and could be very annoying from user point of view. The need for different sensor modes is even more likely in the future as newer sensors are developed that have big resolution (such as 20 megapixels or more).

Figure 4:
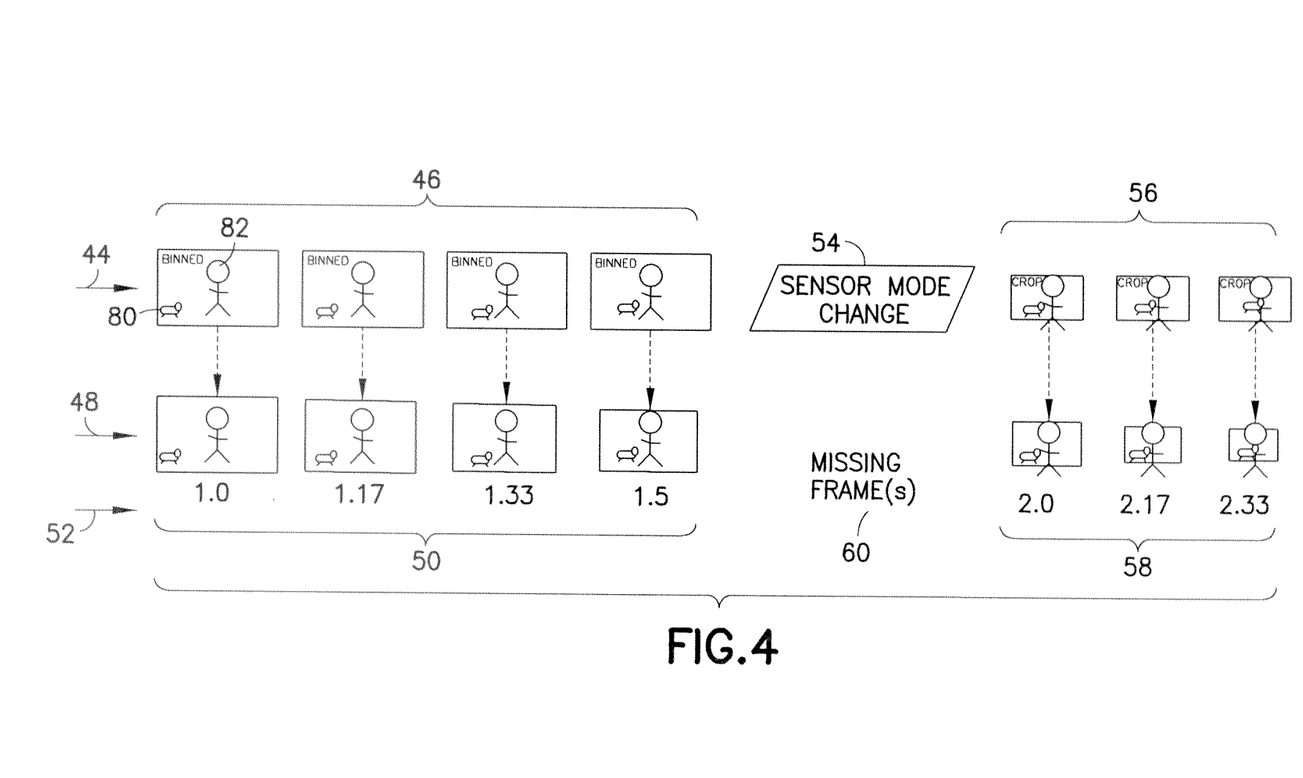
FIG. 4 is a diagram illustrating missing frames may occur during digital zooming when a sensor mode change occurs.

As seen in FIG. 4, an example of the capture flow may comprise the zoom value for a current frame being calculated and the processing unit configured to produce the requested zoom. The row 44 illustrates the input from the camera sensor. The row 48 illustrates the zoomed output of the processing unit. In the row 44 the first frames 46 are captured and a binned sensor mode is used to produce the first set of images 50 having the zoom values as indicated by row 52. The passage of time is illustrated the movement of the dog 80 relative to the person 82 in the images.

If the new zoom value nee a different sensor mode, such changing from binned to cropped for example, sensor mode change is performed as illustrated by 54. After sensor mode change 54 is initiated, the system waits while the sensor mode is changed. After the sensor mode change 54 is completed, the frames 56 are subsequently captured from the sensor, and the frames are processed with the requested zoom produced by applying the needed new different sensor mode. In this example in the row 44 the frames 56 are captured and a cropped sensor mode is used to produce the set of images having the zoom values as indicated by row 52. As noted above, because the sensor mode change will take some time, the mode change without features as described below may cause a visible jump in the preview and/or video stream because the framerate will not stay constant. In other words, there will be frames missing as illustrated by 60.

Figure 5:
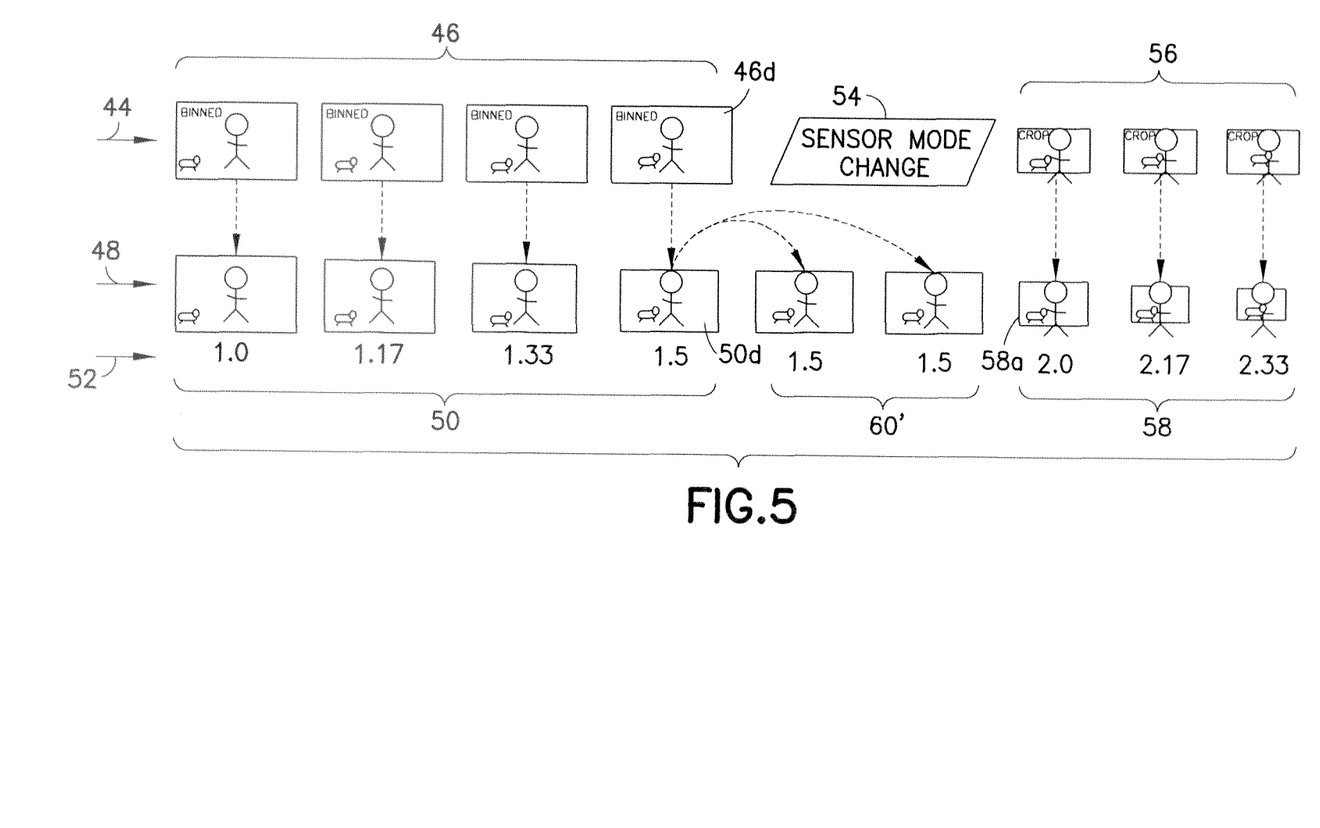
FIG. 5 is a diagram illustrating an example method where a frame taken before the sensor mode change may be used to substitute for the missing frames.

In one example method, the missing frame(s) are merely replaced by the last zoomed frame. For example, referring also to FIG. 5, when the sensor mode change 54 occurs during zooming in, frame 50d is used as substitute frames 60' for the missing frame(s). Frame 50d is merely formed from frame 46d using a zoom value of 1.5. Thus, the substitute or fake frames 60' are identical to frame 50d; merely copies of frame 50d. As another example, when zooming out, the missing frame(s) 60 may be replaced by frame 58a at zoom value 2.0.

Referring also to another method for replacing or substituting for the missing frame(s) 60 will be described. A first step may be to simply reuse the last received frame 46d before the sensor mode change 54 occurred, to maintain the correct framerate similar to that shown in FIG. 5, but without actually using 50d as the substitute frames. Using substitute or faked frames will reduce the visible jump as the time delta between the frames before and after the sensor mode change is correct. The second to maintain the steady zoom update frequency during the sensor mode change 54. This is illustrated in line 52. Note the difference between line 52 in FIG. 5 versus line 52 in FIG. 6 at the time of the sensor mode change 54. The zoom value update frequency is kept steady over the sensor mode change 54 (or at least not stagnant). Updating the zoom value during the time of the sensor mode chance 54 will provide significantly smaller visible effect into the video stream 48 by the faked frames 60". Although the content of the faked frames 60" during the sensor mode change is not changing (both of the frames 60" using the same frame 46d as the same content), the steady zooming over that moment in time will have a big effect on the smoothness of the video. In this particular example, frame 60a is formed from frame 46d but with a zoom value of 1.67, and frame 60b is formed from frame 46d but with a zoom value of 1.83. After the sensor mode change 54 is completed, frame 58a is formed from the new input frame 56a and the updated zoom value of 2.0.

Figure 6:
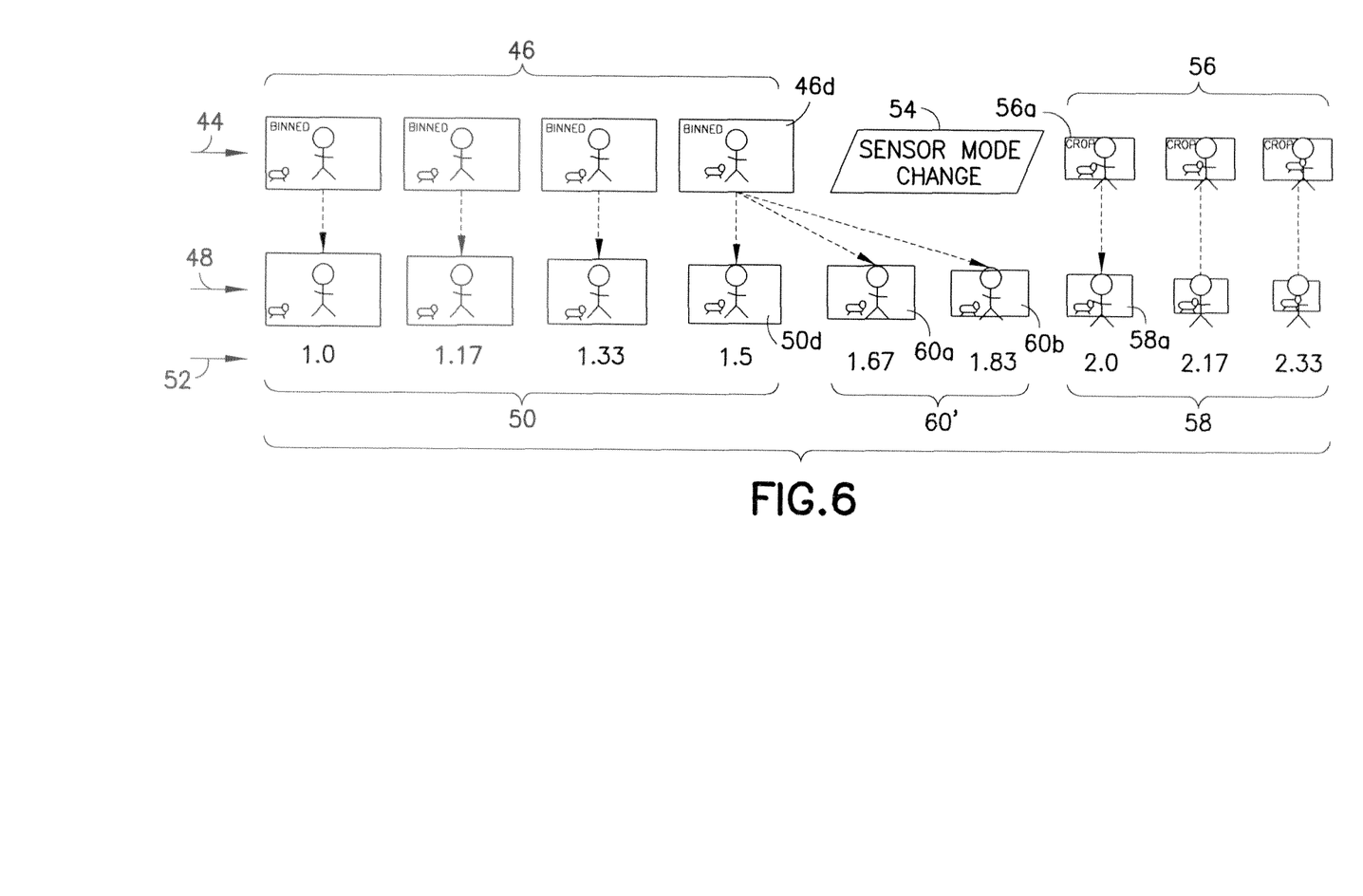
FIG. 6 is a diagram illustrating an example method where a frame taken before the sensor mode change may be used in combination with updating zoom values to substitute for the missing frames.

In one example embodiment the sensor mode change 54 may be started early as illustrated in FIG. 6 such that the zoom update can be kept steady. In the example illustration the sensor mode change is triggered at zoom ratio 1.5 to leave room for steady zoom increment towards the 2.0 zoom value provided by the new sensor mode. This can be considered as a "predictive" sensor mode change. Alternatively, the sensor mode change may be triggered a zoom ratio 2.0. Either of these options may be used depending on details such as if the target zoom value (e.g. 2.33) is known before the sensor mode change and/or if the sensor mode change is done as early as possible or later.

Additionally, in more complex implementations, features may also used to hide the fluctuation in frame caused by the small fluctuation of sensor mode change delay. For example, the delay to make sensor mode change may consists of:

camera sensor programming time+ISP programming time+ sensor internal delay+exposure time if the switching is done via pause state.

Some of these parameters may be hidden and done in parallel. If the above mentioned delay is 1 over the framerate (or multiple of that), then the buffer mechanism can hide in totally. That can be achieved if the sensor is restarted at a suitable moment of time taking into account the mentioned aspects so that sensor mode change will take a constant amount of time. Features as described herein may comprise a steady framerate over the sensor mode change, and a constant zoom value update. Features as described herein may comprise a couple mechanism to reduce the visible jump in the preview/video stream.

The following description helps to explain one example. Assume that the 2.0 zoom ratio has the largest field of view (FOV) that one wants to use with crop sensor mode. Assume that the 1.9 zoom ratio has the smallest FOV that one wants to use with the binned sensor mode. Assume in the below examples that the sensor mode change takes 2 frame times. The change may take more or less frame times. The real solution might have changing time which takes 2-3 frames, such as depending on exposure time/system latencies and, due to that reason, the best solution may comprise a number of frames being faked as being dynamic.

2×2 binning and one crop mode are practical examples. In different implementations more than two modes may be provided such as, for example:

3×3 binning, and

2×2 binning and crop, and a crop only mode.

What is common in these mode sequences is that the apparatus have at least one mode with a wider field of view (FOV) (wider mode) and at least one mode with a smaller field of view (FOV) (tele mode). A crop comprises reading from a sensor a smaller region of interest than the full field of view.

A sensor mode may consist of, for example:

4× vertical binning,
2× horizontal binning, and
2× horizontal scaling.

The binning could be considered as a rough scaling, which could consist of binning and/or sub-sampling. The binning can be analog binning or digital binning or a combination of those.

The apparatus may switch between sensor modes because of a relatively fast framerate such as, for example, 30 fps (or higher). Especially if the camera has a high megapixel sensor, it is not beneficial or perhaps even possible to run the sensor at full resolution 30 fps mode for long periods of the time. The limiting factors might be, for example: power consumption, the camera sensor not being able to run high resolution at video frame rate, or that the rest of the system (interface between sensor and processing unit or the processing unit such as the ISP for example) is not capable to handle such high data rate. For example, an apparatus may provide 40 Mpix*30 fps=1200 Mpix/s. Using 2×2 binning reduces this to 300 Mpix/s, which is significantly less. Using mostly analog binning, reduces the power consumption most.

The target zoom may be considered as a zoom factor that the end user has selected or a target value that the zooming subsystem sees. The system may move from a current zoom factor/value towards the target zoom value.

For predictive zoom, when zooming-in (wide-to-tele), the target zoom may be larger so that one may predict the modes. For example, if the user has selected a ratio of 3.0×, one could easily step zooms with a 0.1 zoom step size. The following are stepwise examples:

When zooming in (wide-to-tele):
Sensor mode set to wide, user seen frame with zoom ratio 1.6
Sensor mode set to wide, user seen frame with zoom ratio 1.7
 [after this the system should know, before the sensor mode switch, the target zoom ratio is 2.0 or higher unless the apparatus assumes/guesses it]
Sensor mode switching starts, a faked user frame with zoom ratio 1.8 is provided
Sensor mode switch ongoing, a faked user frame with zoom ratio 1.9 is provided
Sensor mode set to cropped, user seen frame with zoom ratio 2.0
When zooming out (tele-to-wide), one could have:
Sensor mode cropped, user seen frame with zoom ratio 2.3
Sensor mode cropped, user seen frame with zoom ratio 2.2
 [after this one may need to know, before the sensor mode switch, that the target zoom ratio is 1.9 or smaller unless the apparatus assumes/guesses it]
Sensor mode switching starts, faked frame with zoom ratio 2.1
Sensor mode switching ongoing, faked frame with zoom ratio 2.0
Sensor mode wide, user seen frame with zoom ratio 1.9
Sensor mode wide, user seen frame with zoom ratio 1.8

In the above example cases, predicting is used so that the apparatus may start using the new sensor mode at 2.0 zoom ratio when zooming in and 1.9 when zooming out.

Without predictive zoom, when just duplicating the faked frames, the apparatus could provide:
Zoom in:
Sensor mode wide, user seen frame with zoom ratio 1.8
Sensor mode wide, user seen frame with zoom ratio 1.9 [after this the apparatus may not need to know, before the sensor mode switch, the target zoom ratio]
Sensor mode switching starts, faked user frame with zoom ratio 1.9
Sensor mode switch ongoing, faked user frame with zoom ratio 1.9
Sensor mode cropped, user seen frame with zoom ratio 2.0
In this case, the missing frames from the camera sensor are not substantially evident just showing the previous frame multiple times at a same zoom ratio.
Zoom out:
Sensor mode cropped, user seen frame with zoom ratio 2.1
Sensor mode cropped, user seen frame with zoom ratio 2.0
 [after this the apparatus may not need to know, before the sensor mode switch, the target zoom ratio]
Sensor mode switching starts, faked frame with zoom ratio 2.0
Sensor mode switching ongoing, faked frame with zoom ratio 2.0
Sensor mode wide, user seen frame with zoom ratio 1.9
Sensor mode wide, user seen frame with zoom ratio 1.8
In this case, the missing frames from the camera sensor are not substantially evident by just showing the previous frame multiple times at a same zoom ratio.

A 3rd option is also predictive. The main difference when zooming in, versus the previously described predictive method, is that the above predictive solution, the idea was to take the new sensor mode (the crop mode in the example) into use as early as possible (meaning zoom ratio 2.0 in the above example). In this third option, the new sensor mode may be taken into use later, such as the wide sensor mode being used as late as possible for example.

Zoom in:
Sensor mode wide, user seen frame with zoom ratio 1.8
Sensor mode wide, user seen frame with zoom ratio 1.9 [at this moment, before the sensor mode switch, the apparatus may need to know that the target zoom ratio is 2.0 or higher unless the apparatus assumes/guesses the target zoom ratio]
Sensor mode switching starts, faked user frame with zoom ratio 2.0
Sensor mode switch ongoing, faked user frame with zoom ratio 2.1*
Sensor mode cropped, user seen frame with zoom ratio 2.2*
The user seen zoom ratio in frames marked with "*" could be, for example, 2.0, 2.1 or 2.2 depending on what is the target zoom.
Zoom out:
Sensor mode cropped, user seen frame with zoom ratio 2.3
Sensor mode cropped, user seen frame with zoom ratio 2.2
 [after this the apparatus may need to know, before the sensor mode switch, that the target zoom ratio is 1.9 or smaller unless the apparatus assumes/guesses it]
Sensor mode switching starts, faked frame with zoom ratio 2.1
Sensor mode switching ongoing, faked frame with zoom ratio 2.0
Sensor mode wide, user seen frame with zoom ratio 1.9
Sensor mode wide, user seen frame with zoom ratio 1.8

In other example embodiments, the apparatus may use a mix of predictive and "just duplicating the faked frames". For example, the apparatus might use predictive when zooming in, and use duplicating when zooming out.

The terminology "predictive" can be understood at least in two ways. If we start the switching as early as possible (due to knowing that the current zoom is 1.8 and that the target is higher than 2.0, and that the switching takes 2 frame times), one could call this as a predictive switching. If the zooming behavior is done in a way that zooming follows the swipe of user's finger on the touchscreen 14 directly for example, then the target zoom value may be close to a current zoom value. In such cases, "predictive" could be considered to mean that, based on the current zoom and the speed of zooming and direction, could predict that there will be more zooming in that direction; meaning that the apparatus can start the sensor mode switching earlier.

One practical approach could be that:

when zooming in, user may use a greyed box on a touchscreen, and when the user lifts his/her finger the final target zoom ratio is known and the zooming may start. This maps very well to the simple predictive switching, and makes the predictive sensor mode switching easy.

when zooming out, the FOV and zooming-out may follow the user's "moving finger". In this case, the more complex term for prediction could be used or then the solution could alternatively be the simpler "duplication of frames" described above.

The used zoom steps may be different than the 0.1 step size or the bigger step size shown in the drawings. These steps sizes were merely used for descriptive purposes and should not be considered as limiting. The practical values which might be used are likely a bit smaller than 0.1 and the step size can also be non-constant depending on how fast zooming is wanted and/or if the zoom speed is constant or not. The step size can also be different at wide or tele positions.

Features as described herein may be used to reduce the visible artifact caused by the sensor mode change 54 by keeping the framerate and zoom value update constant by faking the missed frames. The faking may be done by filling the missing frame(s) using the frame just before the sensor mode change. To make the transition as smooth as possible the zoom value update may also be kept steady over the sensor mode change by applying new zoom value(s) for one or more of the duplicate frame(s).

In one type of example embodiment, an apparatus is provided comprising at least one processor; and at least one non-transitory memory including computer program code, the at least one memory and the computer program code configured to, with the at least one processor, cause the apparatus at least to, during a digital zoom having increasing or decreasing zoom values for first frames taken by a camera, and based upon a sensor mode changing from a first sensor mode to a different second sensor mode, such as a zoom mode changing for example, using at least one new different zoom value to one of the first frames captured by the camera before the sensor mode change to form at least one new second frame.

The apparatus may further be configured to comprise determining a rate of change of the digital zoom before the sensor mode change and using the rate of change to at least partially determine the new different zoom value. Using the at least one new different zoom value may comprise using at least two new different zoom values to the first frame, captured by the camera before the sensor mode change, to form at least two new second frames. The apparatus may further comprise determining a target zoom value of the digital zoom, and using the at least one new different zoom value to the first frame captured by the camera before the sensor mode change based, at least partially, upon the determined target zoom value. The apparatus may further comprise updating the different zoom value based, at least partially, upon time. The apparatus may further be configured to comprise recording with a framerate as substantially constant during the digital zoom including during the sensor mode change. The apparatus may further be configured to comprise maintaining a zoom value update of the zoom values as substantially constant during the digital zoom including during the sensor mode change. Using the new different zoom value may occurs either during the digital zoom having increasing zoom values, and where using the new different zoom value does not occur during the digital zoom having decreasing zoom values, or during the digital zoom having decreasing zoom values, and where using the new different zoom value does not occur during the digital zoom having increasing zoom values. During the sensor mode change the camera may not capture the first frames, and where the at least one memory and the computer program ode are configured to, with the at least one processor, cause the apparatus at least to use at least one of the first frames as a frame during the sensor mode change when the camera does not capture frames.

Figure 7:
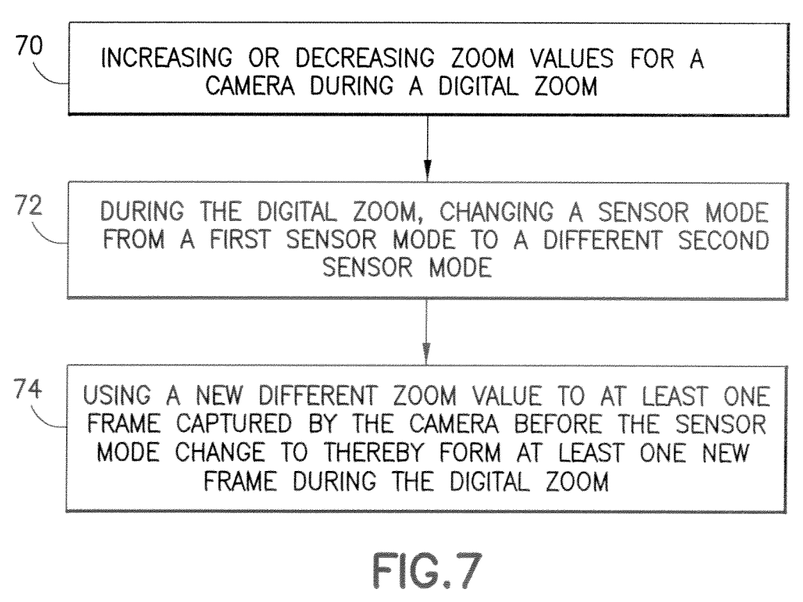
FIG. 7 is a diagram illustrating one example method.

Referring also to FIG. 7, an example method may comprise increasing or decreasing zoom values for a camera during a digital zoom as indicated by block 70; during the digital zoom, changing a sensor mode of the digital zoom from a first sensor mode to a different second sensor mode as indicated by block 72; and using a new different zoom value to at least one frame captured by the camera before the sensor mode change to thereby form least one new frame during the digital zoom as indicated by block 74.

The method may further comprise determining a rate of change of the digital zoom before the sensor mode change and using the rate change to at least partially determine the new different zoom value. Using the at least one new different zoom value may comprise using at least two new different zoom values to the first frame, captured by the camera before the sensor mode change, to form at least two new second frames. The method may further comprise determining target zoom value of the digital zoom, and using the at least one new different zoom value to the first frame captured by the camera before the sensor mode change based, at least partially, upon the determined target zoom value. The method may further comprise updating the different zoom value based, at least partially, upon time. The method may further comprise recording with a framerate as substantially constant during the digital zoom including during the sensor mode change. The method may further comprise maintaining a zoom value update of the zoom values as substantially constant during the digital zoom including during the sensor mode change. Using the new different zoom value occurs either during the digital zoom having increasing zoom values, and where using the new different zoom value does not occur during the digital zoom having decreasing zoom values, or during the digital zoom having decreasing zoom values, and where using the new different zoom value does not occur during the digital zoom having increasing zoom values. During the sensor mode change the camera may not capture the first frames, and where the at least one memory and the computer program code are configured to, with the at least one processor, cause the apparatus at least to use at least one of the first frames as a frame during the sensor mode change when the camera does not capture frames.

An example embodiment may comprises a non-transitory program storage device readable by a machine, tangibly embodying a program of instructions executable by the machine for performing operations, the operations comprising increasing or decreasing camera zoom values during a digital zoom; during the digital zoom, changing a sensor mode of the digital zoom from first sensor mode to a different second sensor mode; and using a new different zoom value to at least one frame captured by a camera before the sensor mode change to form at least one new frame during the digital zoom.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one processor; and
   at least one non-transitory memory including computer program code, the at least one non-transitory memory and the computer program code configured to, with the at least one processor, cause the apparatus at least to:
   during a digital zoom having increasing or decreasing zoom values for first frames taken by a camera, and based upon a sensor mode changing from a first sensor mode to a different second sensor mode, use at least one of the first frames captured by the camera before the sensor mode change to form at least one new second frame during the sensor mode change;
   use at least one new different zoom value to form the at least one new second frame; and
   determine a rate of change of the digital zoom before the sensor mode change, and use the rate of change to at least partially determine the new different zoom value.

2. The apparatus as in claim 1 where the at least one non-transitory memory and the computer program code are configured to, with the at least one processor, cause the apparatus to use the at least one new different zoom value comprising using at least two new different zoom values with the first frame, captured by the camera before the sensor mode change, to form at least two of the new second frames.

3. The apparatus as in claim 1 where the at least one non-transitory memory and the computer program code are configured to, with the at least one processor, cause the apparatus to
   determine a target zoom value of the digital zoom, and
   use the at least one new different zoom value to the first frame captured by the camera before the sensor mode change based, at least partially, upon the determined target zoom value.

4. The apparatus as in claim 1 where the at least one non-transitory memory and the computer program code are configured to, with the at least one processor, cause the apparatus to update the different zoom value based, at least partially, upon time.

5. The apparatus as in claim 1 where the at least one non-transitory memory and the computer program code are configured to, with the at least one processor, cause the apparatus to record the frames with a framerate being substantially constant during the digital zoom including during the sensor mode change.

6. The apparatus as in claim 1 where the at least one non-transitory memory and the computer program code are configured to, with the at least one processor, cause the apparatus to maintain a zoom value update of the zoom values substantially constant during the digital zoom including during the sensor mode change.

7. The apparatus as in claim 1 where the at least one non-transitory memory and the computer program code are configured to, with the at least one processor, cause the apparatus to use the new different zoom value either:
   during the digital zoom having increasing zoom values, and where using the new different zoom value does not occur during the digital zoom having decreasing zoom values, or
   during the digital zoom having decreasing zoom values, and where using the new different zoom value does not occur during the digital zoom having increasing zoom values.

8. The apparatus as in claim 1 where during the sensor mode change the camera does not capture the first frames, and where the at least one non-transitory memory and the computer program code are configured to, with the at least one processor, cause the apparatus at least to:
   use at least one of the first frames as a frame during the sensor mode change when the camera does not capture frames.

9. A method comprising:
   increasing or decreasing zoom values for a camera during a digital zoom;
   during the digital zoom, changing a sensor mode of the digital zoom from a first sensor mode to a different second sensor mode; and
   during the digital zoom, using at least one first frame captured by the camera before the sensor mode change to thereby form at least one new second frame during the digital zoom;
   using at least one new different zoom value with the at least one first frame to thereby form the at least one new second frame during the digital zoom; and
   determining a rate of change of the digital zoom before the sensor mode change and using the rate of change to at least partially determine the new different zoom value.

10. The method as in claim 9 where using the at least one new different zoom value comprises using at least two new different zoom values with the first frame, captured by the camera before the sensor mode change, to form at least two new second frames.

11. The method as in claim 9 further comprising:
    determining a target zoom value of the digital zoom, and
    using the at least one new different zoom value to the first frame captured by the camera before the sensor mode change based, at least partially, upon the determined target zoom value.

12. The method as in claim 9 further comprising recording the frames with a framerate being substantially constant during the digital zoom including during the sensor mode change.

13. The method as in claim 9 further comprising maintaining a zoom value update of the zoom values as substantially constant during the digital zoom including during the sensor mode change.

14. The method as in claim 9 where using the at least one new different zoom value occurs either:
    during the digital zoom having increasing zoom values, and where using the at least one new different zoom value does not occur during the digital zoom having decreasing zoom values, or
    during the digital zoom having decreasing zoom values, and where using at least one the new different zoom value does not occur during the digital zoom having increasing zoom values.

15. A non-transitory program storage device readable by a machine, tangibly embodying a program of instructions executable by the machine for performing operations, the operations comprising:
    increasing or decreasing camera zoom values during a digital zoom;
    during the digital zoom, changing a sensor mode of the digital zoom from a first sensor mode to a different second sensor mode; and
    using at least one first frame captured by a camera before the sensor mode change to form at least one new second frame during the sensor mode change;
    using at least one new different zoom value with the at least one first frame to thereby form the at least one new second frame during the digital zoom; and
    determining a rate of change of the digital zoom before the sensor mode change and using the rate of change to at least partially determine the new different zoom value.

16. The non-transitory program storage device as in claim 15 where using the at least one new different zoom value comprises using at least two new different zoom values with the first frame, captured by the camera before the sensor mode change, to form at least two new second frames.

17. The non-transitory program storage device as in claim 15, the operations further comprising:
    determining a target zoom value of the digital zoom, and
    using the at least one new different zoom value to the first frame captured by the camera before the sensor mode change based, at least partially, upon the determined target zoom value.

18. The non-transitory program storage device as in claim 15, the operations further comprising recording the frames with a framerate being substantially constant during the digital zoom including during the sensor mode change.

19. The non-transitory program storage device as in claim 15 the operations further comprising maintaining a zoom value update of the zoom values as substantially constant during the digital zoom including during the sensor mode change.

20. The non-transitory program storage device as in claim 15 where using the at least one new different zoom value occurs either:
    during the digital zoom having increasing zoom values, and where using the at least one new different zoom value does not occur during the digital zoom having decreasing zoom values, or
    during the digital zoom having decreasing zoom values, and where using the at least one new different zoom value does not occur during the digital zoom having increasing zoom values.

* * * * *